US009900368B2

(12) United States Patent
Olrog (10) Patent No.: US 9,900,368 B2
(45) Date of Patent: Feb. 20, 2018

(54) METHOD FOR OPTIMISING DOWNLOADING OF DATA

(75) Inventor: Christian Olrog, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 236 days.

(21) Appl. No.: 14/390,875

(22) PCT Filed: Apr. 11, 2012

(86) PCT No.: PCT/SE2012/050387
§ 371 (c)(1),
(2), (4) Date: Oct. 6, 2014

(87) PCT Pub. No.: WO2013/154473
PCT Pub. Date: Oct. 17, 2013

(65) Prior Publication Data
US 2015/0172357 A1 Jun. 18, 2015

(51) Int. Cl.
*H04L 29/08* (2006.01)
*H04L 29/06* (2006.01)
(52) U.S. Cl.
CPC ............. *H04L 67/02* (2013.01); *H04L 67/28* (2013.01); *H04L 67/42* (2013.01); *H04L 69/163* (2013.01); *H04L 67/18* (2013.01); *H04L 67/303* (2013.01)
(58) Field of Classification Search
CPC ......... H04L 67/02; H04L 67/18; H04L 67/28; H04L 67/303; H04L 67/42; H04L 69/163
See application file for complete search history.

(56) References Cited

U.S. PATENT DOCUMENTS

| 8,169,909 B2* | 5/2012 | Kakani | H04L 47/10 370/229 |
| 8,416,694 B2* | 4/2013 | Meyer | H04L 47/10 370/230.1 |
| 2005/0135248 A1* | 6/2005 | Ahuja | H04L 47/10 370/235 |
| 2011/0295979 A1 | 12/2011 | Alstad et al. | |

(Continued)

FOREIGN PATENT DOCUMENTS

| WO | WO 2005/062548 A1 | 7/2005 | |
| WO | WO 2005062548 A1 * | 7/2005 | H04L 47/10 |

OTHER PUBLICATIONS

International Search Report, PCT Application No. PCT/SE2012/050387, dated Apr. 29, 2013.

(Continued)

*Primary Examiner* — Uzma Alam
(74) *Attorney, Agent, or Firm* — Patent Portfolio Builders, PLLC (57) ABSTRACT

A first node is associated with a client by a first TCP connection and associated with a second node by a second TCP connection. When downloading HTTP transferred data the first node receives from the client a request, requesting the HTTP transferred data from the second node, and initiates an interaction between the first node and the client by sending to the client a first response. The first node forwards the request to the second node, and forwards to the client a subsequent response received from the second node, and forwards to the client the HTTP transferred data at an available bit-rate, after being received from the second node. The first response is sent to the client before the subsequent response is forwarded to the client, and the available bit-rate for the requested HTTP transferred data is determined from the interaction between the client and the first node.

18 Claims, 8 Drawing Sheets

(56) References Cited

U.S. PATENT DOCUMENTS

2012/0170451 A1* 7/2012 Viswanathan ........ H04W 4/005
  370/230
2012/0278477 A1* 11/2012 Terrell ................ H04L 41/5009
  709/224
2013/0024523 A1* 1/2013 Albasheir ............... H04L 47/34
  709/206

OTHER PUBLICATIONS

Written Opinion of the International Searching Authority, PCT Application No. PCT/SE2012/050387, dated Apr. 29, 2013.

ETSI, Technical Report—"Satellite Earth Stations and Systems (SES); Broadband Satellite Multimedia (MSM); Performance Enhancing Proxies (PEPs)", ETSI TR 102 676 V1.1.1 (Nov. 2009), 42 pp.

faqs.org, "RFC 2001—TCP Slot Start, Congestion Avoidance, Fast Retransmit", downloaded Sep. 30, 2014 from http://www.faqs.org/rfcs/rfc2001.html, 6 pp.

Fielding et al., "Hypertext Transfer Protocol—HTTP/1.1", Network Working Group, Request for Comments: 2616, Obsoletes: 2068, Category: Standards, downloaded Sep. 30, 2014 from http://tools.ietf.org/html/rfc2616, 122 pages.

Peterson et al., "TCP Congestion Control", Lecture material taken from *Computer Networks A System Approach, Third Edition*, Morgan Kaufmann Publishers, Inc., 2003, 29 pp.

Zhang et al., "On Wide Area Network Optimization", *IEEE Communications Surveys & Tutorials*, vol. 14, No. 4, Fourth Quarter 2012, pp. 1090-1113.

\* cited by examiner

METHOD FOR OPTIMISING DOWNLOADING OF DATA

CROSS REFERENCE TO RELATED APPLICATION

This application is a 35 U.S.C. § 371 national stage application of PCT International Application No. PCT/SE2012/050387, filed on 11 Apr. 2012, the disclosure and content of which is incorporated by reference herein in its entirety. The above-referenced PCT International Application was published in the English language as International Publication No. WO 2013/154473 A1 on 17 Oct. 2013.

TECHNICAL FIELD

The present invention relates generally to a method for optimising downloading of data, especially for downloading of HTTP transferred data in wireless communication networks.

BACKGROUND

With the emergence of Internet, end-users have been provided with the possibility to get information and performing different services by applying computers connected to the Internet. Today there are a wide range of services available and the number of services increases constantly. End-users can for instance read news, take part in specific communities, search information, do banking business, play games, order articles or services from Internet shops, borrow e-books from libraries, etc. The end-users apply different clients to access the Internet, such as e.g. computers being connected via fixed or wireless connections.

When applying wireless clients, such as e.g. mobile phones, or handheld computers, they usually connect to the Internet by cellular communication networks based on technologies, such as e.g. HSPA (High Speed Packet Access), or LTE, (Long Term Evolution), WiMax, or Wi-Fi.

TCP (Transmission Control Protocol) is a connection oriented protocol for data communication which is mainly applied for data communication over the Internet. In TCP, the information is divided into IP packets, which are communicated between communicating parties. When a packet, which was sent from a sending party, is successfully received by a receiving party, the receiving party responds by confirming the successful reception by sending an ACK-command to the sending party. Therefore, the communicating parties will be aware of the result of the transmission and could test to increase the bit-rate for the initiated transmission, e.g. by sending two packets instead of one, i.e. twice the original bit-tare. If the sending party does not receive an ACK, the corresponding packet is considered lost and the sending party will therefore retransmit it. TCP provides a reliable connection between communicating parties and is typically applied for protocols such as e.g. HTTP (Hyper-Text Transmission Protocol) or FTP (File Transfer Protocol).

When applying TCP, the transmission will try to apply the full available bit-rate, but starts with an initial bit-rate and increases the bit-rate depending on the received ACK:s, as described above.

Various types of data which is stored at different servers could be downloaded to end-users's clients in accordance with HTTP. Such data could be e.g. webpages, music, video, images. HTTP is a protocol in the application layer of the TCP/IP model (Transmission Control Protocol/Internet Protocol).

Webpages are stored at web servers in parts, typically referred to as frames. When a webpage is requested by a requesting party, the web server storing the webpage will prepare the requested webpage by arranging the frames accordingly, i.e. by building the webpage, before starting to send it to the requesting party. For other types of HTTP transferred data, the servers will prepare the data to be transferred before sending it. For instance, a stored image will be formatted according to HTTP.

Figure 1:
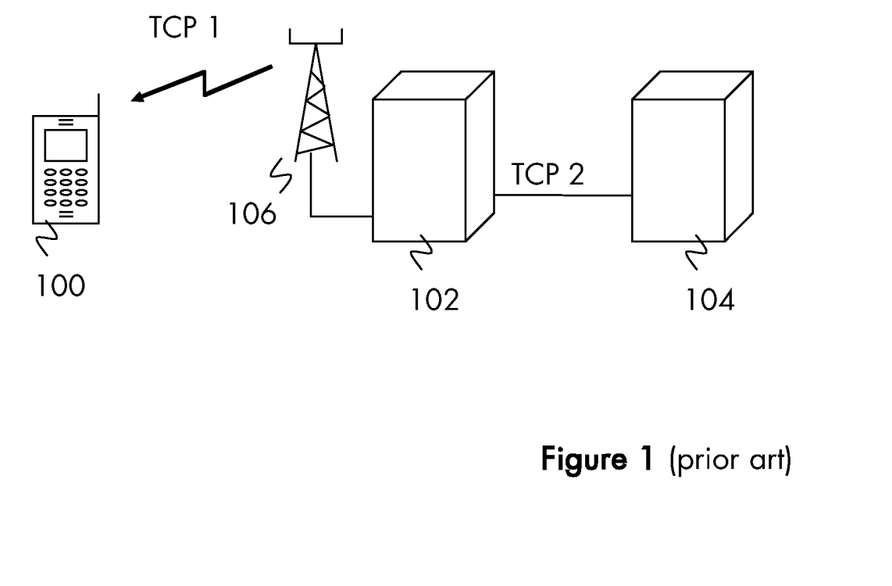
FIG. 1 is an environmental illustration of a communication arrangement, according to the prior art.

With reference to FIG. 1, which is an environmental illustration of a communication arrangement, a scenario where a client 100 downloads a webpage from a web server 104 will now be described, according to the prior art.

An end-user applies a client 100 for downloading the webpage from the web server 104. The client 100 is here illustrated as forming part of a mobile phone, but could instead be implemented in any other communication terminal which is capable of downloading webpages from the web server 104. In a typical scenario, the client 100 could e.g. be implemented as a computer connected to the Internet. In general, clients 100 are not connected directly to web servers, but are typically connected via intermediate communication nodes, e.g. proxy servers. In this example, a proxy server 102 is arranged between the client 100 and the web server 104, and communicates according to TCP with the client 100 and the web server 104. The proxy server 102 communicates data with the client 100 on a first TCP connection, here referred to as TCP 1, over a radio interface via a radio base station 106. The proxy server 102 also communicates data with the web server 104 on a second TCP, here referred to as connection TCP2.

Figure 2:
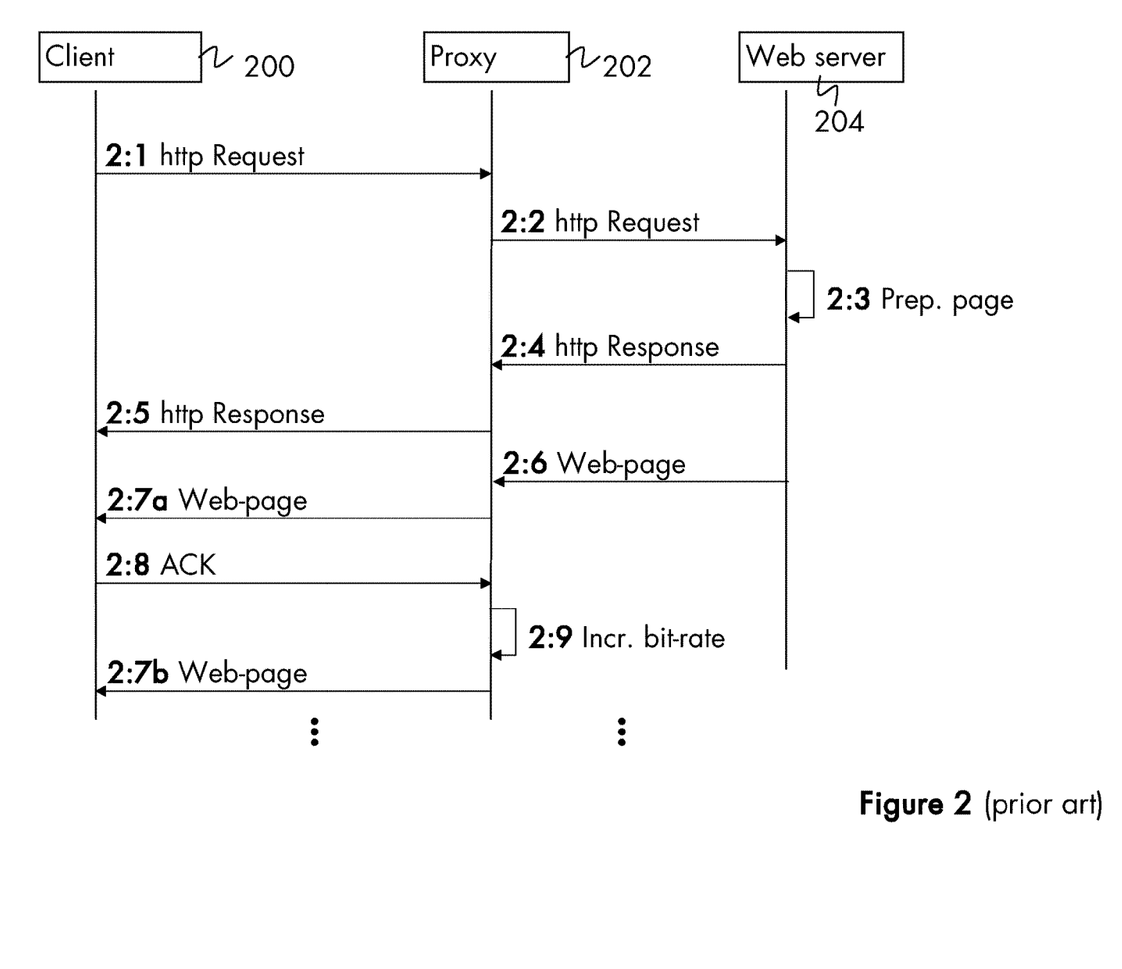
FIG. 2 is a signalling diagram illustrating a procedure for downloading of a webpage, according to the prior art.

With reference to FIG. 2, which is a signalling chart, a scenario where a client 200 downloads a webpage from a web server 204 via a proxy server 202 will now be described, according to the prior art.

The proxy server 202 is communicating with the client 200 on a first TCP connection, and communicates with the web server 204 on a second TCP connection. Typically, the communication capacity of the first TCP connection is lower that the communication capacity of the second TCP connection, and, as a consequence, the bit-rate for communication of data is lower on the first TCP connection.

When the client 200 wants to download a webpage from the web server 204, the client sends 2:1 a request for the webpage to the proxy server 202, where the request is typically realised as "http 1.1 get". Then the proxy server 202 requests 2:2 the webpage from the web server 204, by sending a request, typically realised as "http 1.1 get". When the web server 204 receives the request, the web server starts to prepare or build 2:3 the webpage to be sent to the client 200. When the webpage has been prepared, the web server 204 informs the proxy server 202 that the webpage will start to be downloaded by sending a response, here implemented as "http/1.0 200 OK", which response is then forwarded 2:5 by the proxy server 202 to the client 200.

The prepared webpage is downloaded 2:6 to the proxy server 202, which will then download 2:7a, 2:7b the webpage to the client 200. When communicating according to TCP, the webpage is divided into IP packets which are sent to the client 200. The proxy server 202 is initially not aware of the communication capacity of the first TCP connection and in order to evaluate the current communication condition and reliably transfer all the packets of the webpage without packet losses, the proxy server 202 therefore starts the downloading of the webpage by sending 2:7a a first part of the webpage at a first bit-rate, and waits for the first part to be acknowledged by the client 200, which, upon a successful receipt, sends 2:8a an ACK in response to the first part. When the proxy server 202 receives the ACK, it will increase 2:9 the bit-rate and send 2:7b a further part of the webpage at a second, higher bit-rate. As long as the proxy server 202 receives 2:8a, 2:8b ACK:s in response to a sent 2:7a, 2:7b part of the webpage, the proxy continues to increase 2:9 the bit-rate when sending 2:7a, 2:7b a further part of the webpage. When the proxy server 202 does not receive a specific ACK, it will instead resend the packet which corresponds to the missing ACK and proceed sending remaining parts of the webpage, applying the so far highest bit-rate which has been acknowledged.

The applied bit-rate is related to how many packets the proxy server 202 sends at a time. Initially, it sends one packet and when receiving an ACK, the proxy server 202 typically sends two packets next time, followed by four packets, etc.

With the described process, the resulting time for finding the available bit-rate could be significant, when evaluating the communication conditions. Especially for small amounts of data to be downloaded, where the amounts of communicated packets are limited, the resulting time of evaluation roundtrips could be close to or above the time of the download itself. For instance, the highest available bit-rate may not even be applied during the download. There is therefore in many situations a problem to effectively effectuate data communication on TCP communication links.

SUMMARY

It is an object of the present document to address at least some of the problems and issues outlined above. It is possible to achieve these objects and others by using a method and an apparatus as defined in the attached independent claims.

According to one aspect, a method in a first communication network node in a communication network is provided for enabling optimised downloading of HyperText Transfer Protocol, HTTP, transferred data such as, e.g. webpages, to a client. The first communication network node, e.g. a proxy server, is associated to the client, e.g. a user equipment, by a first Transmission Control Protocol, TCP, connection, and the first communication network node is further associated to a second communication network node, e.g. a web server, by a second TCP connection. In the method a request is received from the client, requesting for HTTP transferred data from the second communication node. An interaction is initiated between the first communication network node and the client by sending a first response to the client in response to the request. The request is forwarded to the second communication network node and a subsequent response is forwarded to the client after being received from the second communication network node in response to the forwarded request. The HTTP transferred data is forwarded to the client at an available bit-rate, after being received from the second communication network node.

In the method, the first response is sent to the client before the subsequent response is forwarded to the client, and the available bit-rate for the requested HTTP transferred data is determined at least partly as a result of the interaction between the client and the first communication network node. By applying such an interaction while the HTTP transferred data is being prepared by the second communication node, instead of just waiting for the HTTP transferred data to be delivered, the first communication node can determine the available bit-rate, and the downloading process can thus be shortened.

Furthermore, the interaction may comprise reception of one or more acknowledgements and sending of one or more intermediate responses, where each acknowledgment acknowledges a successful reception of a respective of the first or the intermediate responses. Moreover, the first response may comprise one legal symbol to be sent in one packet, and the intermediate packets may comprise two or more legal symbols to be sent simultaneous in separate packets. The legal symbols which are already transmitted in the first response and the intermediate responses may further be removed from the subsequent response, to be in accordance with HTTP.

In the method the first communication network node may further make a decision whether or not the method for optimised downloading of HTTP transferred data will be applied. Such a decision may be based on one or more of: knowledge about communication properties of the first TCP connection, knowledge about client properties, heuristics of prior determined available bit-rates for the first TCP connection and location awareness. By applying any standard method for determining the geographic location of the client, the basis for the decision whether or not to apply optimised loading may be further improved. By applying the suggested option, the suggested method may be applied only when required, while any other conventional method may instead be applied otherwise.

According to another aspect, a method in a communication network node in a communication network is provided for enabling optimised downloading of HTTP transferred data to a client, without requiring any intermediate node. The communication network node is associated to the client by a TCP connection. In the method a request for the HTTP transferred data is received from the client and an interaction between the communication network node and the client is initiated by sending to the client a first response to the request. Furthermore, in response to the request a subsequent response is sent to the client and, the HTTP transferred data is sent to the client at an available bit-rate. The first response is sent to the client before the subsequent response is sent to the client, and the bit-rate available for the requested HTTP transferred data is determined at least partly as a result of the interaction between the client and the communication network node.

Furthermore, when performing the interaction the communication network node may receive one or more acknowledgements, and send one or more intermediate responses, where each acknowledgment acknowledges a successful reception of a respective of the first response and the intermediate responses.

According to yet another aspect, a computer is provided for enabling optimised downloading of HTTP transferred data to a client. The computer is associated to the client by a first TCP connection, further associated to a communication network node by a second TCP connection, and comprises a processor and a memory, wherein the memory is adapted to store instructions which when executed by the processor causes the processor to receive a request from the client, requesting for the HTTP transferred data from the communication network node. The instructions further causes the processor to send a first response to the client in response to the request, and forward the request to the communication network node. Furthermore, the instructions causes the processor to forward to the client a subsequent response, received from the communication network node in response to the request, and forward to the client, the HTTP transferred data received from the communication network node. The processor sends the first response to the client before the subsequent response is forwarded to the client, and the bit-rate available for the requested HTTP transferred data is determined at least partly as a result of an interaction between the client and the computer following the first response.

The memory may further be adapted to store knowledge about characteristics of the client, knowledge about characteristics of the first TCP connection, and further instructions, which when executed by the processor causes the processor to decide that the first response shall be sent, based on knowledge about communication properties of the first TCP connection, knowledge about software properties at the client, etc. The memory may be further adapted to store heuristics based on prior determined available bit-rates for the first TCP connection, and further instructions, which when executed by the processor causes the processor to store the determined available bit-rate. The computer may e.g. be included in a proxy server.

According to a further aspect, a computer is provided for enabling optimised downloading of HTTP transferred data to a client. The computer is associated to the client by a TCP connection, wherein the computer comprises a processor and a memory. The memory is adapted to store instructions which when executed by the processor causes the processor to receive a request for the HTTP transferred data from the client, and send a first response to the client in response to the request. The instructions also cause the processor to send a subsequent response to the client in response to the request, and send the HTTP transferred data to the client. The first response is sent before the subsequent response is sent, and the bit-rate available for the requested HTTP transferred data is determined at least partly as a result of an interaction between the client and the computer following the first response. The communication network node may be included in a web server.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided for enabling HTTP transferred data to be downloaded faster from a server to a client, and to achieve a more effective use of available communication resources, by applying a method which is herein referred to as a method for applying optimized downloading. The client may be any type of client comprised in a communication device which is capable of requesting HTTP transferred data from a server.

HTTP transferred data is stored at servers and preparing the data to be downloaded usually results in various delays. Such delays may e.g. be due to encoding, encrypting, obtaining files to be arranged and sent, etc. For instance, when a webpage is prepared, a plurality of frames and images are obtained from the server and arranged together, before being encoded according to HTTP.

For instance, a proxy server is requested by a client to download a webpage from a web server, where the client is associated to the proxy server by a first TCP connection, and the web server is associated to the proxy server by a second TCP connection. The proxy server requests the webpage from the web server, which starts to prepare the webpage. During the preparation, the proxy server starts evaluating the first TCP connection to determine the available communication capacity. When the proxy server receives the webpage from the web server, the communication capacity of the first TCP connection is evaluated and the proxy will start to download the webpage, applying the available communication capacity, i.e. the available bit-rate. The evaluation itself is performed according to ordinary TCP methods. However, because the proxy server is made aware of a subsequent response which will be forwarded to the client later when the webpage is received, the proxy server will initiate the evaluation before the subsequent response is received, by sending a first response, comprising a first part of the subsequent response in advance. A Proxy server may be arranged between a client and a server, storing HTTP transferred data, either as a transparent proxy server, or as an explicit proxy server. For a transparent proxy server, the client will not be aware of the proxy server and will thus communicates as if it was directly connected to a server storing HTTP transferred data.

When distributing HTTP transferred data, especially on long communication links, delays of the data are noticeable. For instance, when applying a satellite link for the communication, the transmission time is typically about seconds. If the transmission time from a proxy server to a client is e.g. 1 s, each roundtrip, i.e. one response and its corresponding acknowledgement, for evaluating the communication capacity of the TCP connection, takes 2 s. When the available communication capacity is 4 simultaneous packets, i.e. 120 kb/s, 3 roundtrips or 6 seconds are needed to determine the available communication capacity to apply for the requested communication. For small amounts of data to be communicated, especially over communication links with large available communication capacity, the reduced total time for transmission may be substantial.

In the description below, the term "Congestion window" will be used to define the available communication capacity of the first TCP connection, i.e. how many IP packets which could be simultaneously communicated.

When using the methods described in this description for downloading, the largest gain is possible for small amounts of data to be downloaded on TCP connections with a high available bit-rate, i.e. with a large congestion window. In the table below, the total number of evaluation roundtrips is calculated for some different amounts of HTTP data downloaded on TCP connections with three different bit-rates, 120 kb/s enabling 4 packets to be communicated simultaneously, 60 kb/s enabling 2 packets, and 30 kb/s enabling 1 packet.

| Packets to be DL | Bit-rate | Roundtrips, prior art | Roundtrips, described method | Rel. reduce of roundtrips |
|---|---|---|---|---|
| 1000 | 120 kb/s | 252 (1*1 + 1*2 + 249*4 + 1*1) | 250 (250*4) | 0.7% |
| 100 | 120 kb/s | 27 (1*1 + 1*2 + 24*4 + 1*1) | 25 (25*4) | 7.4% |
| 10 | 120 kb/s | 4 (1*1 + 1*2 + 1*4 + 1*3) | 3 (2*4 + 1*2) | 25% |
| 8 | 120 kb/s | 4 (1*1 + 1*2 + 1*4 + 1*1) | 2 (2*4) | 50% |
| 5 | 120 kb/s | 3 (1*1 + 2*2) | 2 (1*4 + 1*1) | 33% |
| 4 | 120 kb/s | 3 (1*1 + 1*2 + 1*1) | 1 (1*4) | 66.7% |
| 1000 | 60 kb/s | 501 (1*1 + 499*2 + 1*1) | 500 (500*2) | 0.2% |
| 100 | 60 kb/s | 51 (1*1 + 49*2 + 1*1) | 50 (50*2) | 2.0% |
| 10 | 60 kb/s | 6 (1*1 + 4*2 + 1*1) | 5 (5*2) | 16.7% |
| 8 | 60 kb/s | 5 (1*1 + 3*2 + 1*1) | 4 (4*2) | 20% |
| 5 | 60 kb/s | 3 (1*1 + 2*2) | 3 (2*2 + 1*1) | 0 |
| 4 | 60 kb/s | 3 (1*1 + 1*2 + 1*1) | 2 (2*2) | 33.3% |
| 10 | 30 kb/s | 10 (10*1) | 10 (10*1) | 0 |
| 8 | 30 kb/s | 8 (8*1) | 8 (8*1) | 0 |

In the table, the first column shows the number of IP packets to be communicated, the second column the available bit-rate on the TCP connection, the third column the total number of roundtrips required for evaluation of the communication capacity and the communication itself on the TCP connection, when applying slow start according to prior art. The fourth column shows the corresponding number of required roundtrips when using the described method, and the fifth column the relative reduce of roundtrips.

Furthermore, in parenthesis, in the third and the fourth columns, the number of roundtrips for each different number of simultaneous IP packets is shown. For instance, row 6 shows a case where 4 IP packets are to be sent and the first TCP connection has a communication capacity of 120 kb/s. By applying the prior art slow start, the proxy server uses 4 roundtrips for evaluation and communication in total; 1 roundtrip with 1 IP packet, 1 roundtrip with 2 simultaneous IP packets, and 1 roundtrip with 1 remaining IP packet. When instead the described method is applied, the capacity is already known when the IP packets will be sent, and all 4 IP packets will instead be sent simultaneously in one roundtrip.

Figure 3:
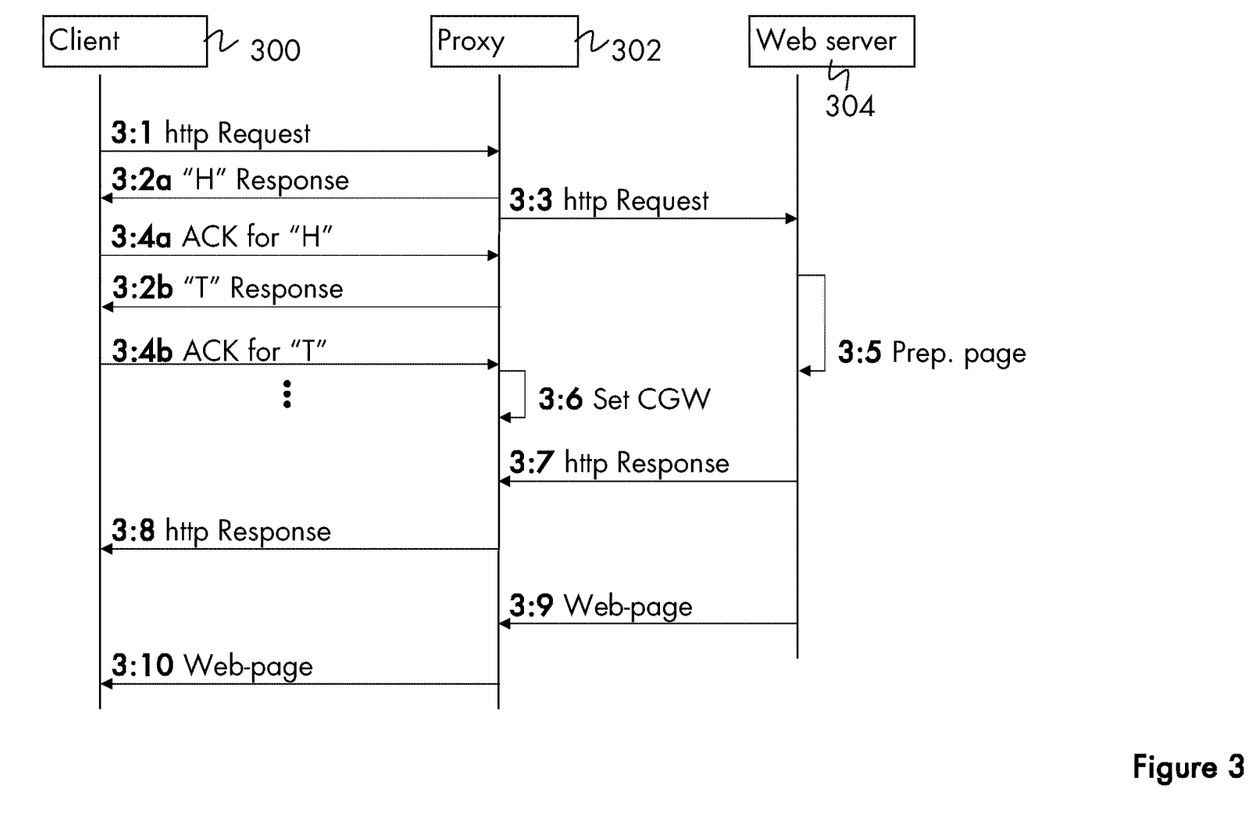
FIG. 3 is a signalling diagram which schematically illustrates a procedure for downloading of a webpage, according to one embodiment.

With reference to FIG. 3, which shows a signalling chart, a scenario where a client 300 downloads a webpage from a web server 304 via a proxy server 302 will now be schematically described, according to an exemplifying embodiment.

The proxy server 302 communicates with the client 300 on a first TCP connection, and communicates with the web server 304 on a second TCP connection.

When the client 300 wants to download a webpage from the web server 304, the client sends 3:1 a request for the webpage to the proxy server 302, where the request is e.g. implemented as "http/1.1 get". The proxy server 302 then performs two actions in response: it initiates an evaluation of the available communication capacity of the first TCP connection by sending 3:2a a first response in one IP packet to the client 300, and by requesting 3:3 the webpage from the web server 304, by forwarding the request, i.e. in the present case "http/1.1 get", to the web server 304. The first response comprises a first legal symbol "h" of a subsequent response "http/1.0 200 OK" which will later be forwarded 3:8 to the client 300 after being received 3:7 from the web server 304. Then, upon a successful reception of the sent 3:2a response at the client 300, the proxy server 302 receives 3:4a an acknowledging ACK in response from the client 300.

When having received 3:4a the ACK, the proxy server 302 continues to interact with the client 300 by sending 3:2b, one or more intermediate responses, and receiving 3:4b, a corresponding ACK for each successfully received response.

The first intermediate response 3:2b is implemented as two similarly sent IP packets, comprising the legal symbols "t", and "t", respectively. The second intermediate response is implemented as four IP packets, comprising the legal symbols "p", "/", "1", ".", respectively, etc. For each positively acknowledged response (first or intermediate), the web server increases 3:6 the congestion window, e.g. from 1 IP packet to 2, from 2 IP packets to 4, etc.

During the interaction described above, the web server 304 prepares 3:5 the webpage to be downloaded, and when the webpage has been prepared the web server indicates this by sending 3:7 the subsequent response to the proxy server 302. When forwarding 3:8 the subsequent response to the client 300, legal symbols which already have been sent with the first response and any intermediate responses are removed from the subsequent response, to be in accordance with HTTP, since these legal symbols have already been sent 3:2a, 3:2b, to the client 300. For instance, when the legal symbols "h", "t" and "t" already have been sent, the subsequent response will here be implemented as "p/1.0 200 OK". For an ordinary slow start according to prior art and illustrated with reference to FIG. 2, the response which is sent 2:5 when the webpage is prepared should instead have been implemented as "http/1.0 200 OK".

By splitting up the subsequent response received 3:7 from the web server and sending the legal symbol of the subsequent response in separate IP packets (i.e. the first response, the intermediate responses and subsequent response), the proxy server 302 will receive an increased amount of corresponding ACK:s from the client 300 earlier, each of which are acknowledged according to TCP, if successfully received. Thereby, the proxy server 302 will be able to increase the congestion window and find the available communication capacity earlier, still by applying the TCP methods.

When the proxy server receives 3:9 the webpage, the available communication capacity for the first TCP connection has been evaluated and the full available communication capacity will be applied for downloading 3:10 of the webpage to the client.

When applying the described procedure, the current communication conditions will be evaluated before the HTTP transferred data starts to be downloaded to the client, i.e. the proxy server will make use of the time when otherwise it would instead have been waiting for the HTTP server to prepare the HTTP transferred data, e.g. for a web server to prepare a webpage. When downloading downloadable content, the proxy server could thereby apply the current available bit-rate already from the start, instead of starting from an initial lower bit-rate and then evaluating whether the bit-rate could reliably be increased. By applying the described procedure, the resulting time for the downloading could be decreased and the proxy server could be released faster to be applied by other clients. Moreover, the client will receive the HTTP transferred data earlier than when applying the prior art procedure, i.e. the user of the client will experience less delay.

It is to be noted that the concept is not limited to the above described embodiment, and that a designer may implement the method differently within the concept as described above. In an alternative embodiment similar to the one described above, the proxy server 302 does not forward the subsequent response and the webpage to the client 300 directly when it is received from the web server 304. Instead, the proxy server 302 awaits acknowledgements of already sent intermediate responses, to be able to increase the congestion window further before forwarding the subsequent response and the webpage, i.e. to obtain an even higher bitrate.

It is also to be noted, that the interaction procedure may be implemented differently within the concept. For instance, instead of acknowledging each intermediate response, the client 300 may instead acknowledge every second intermediate response according to TCP.

Figure 4:
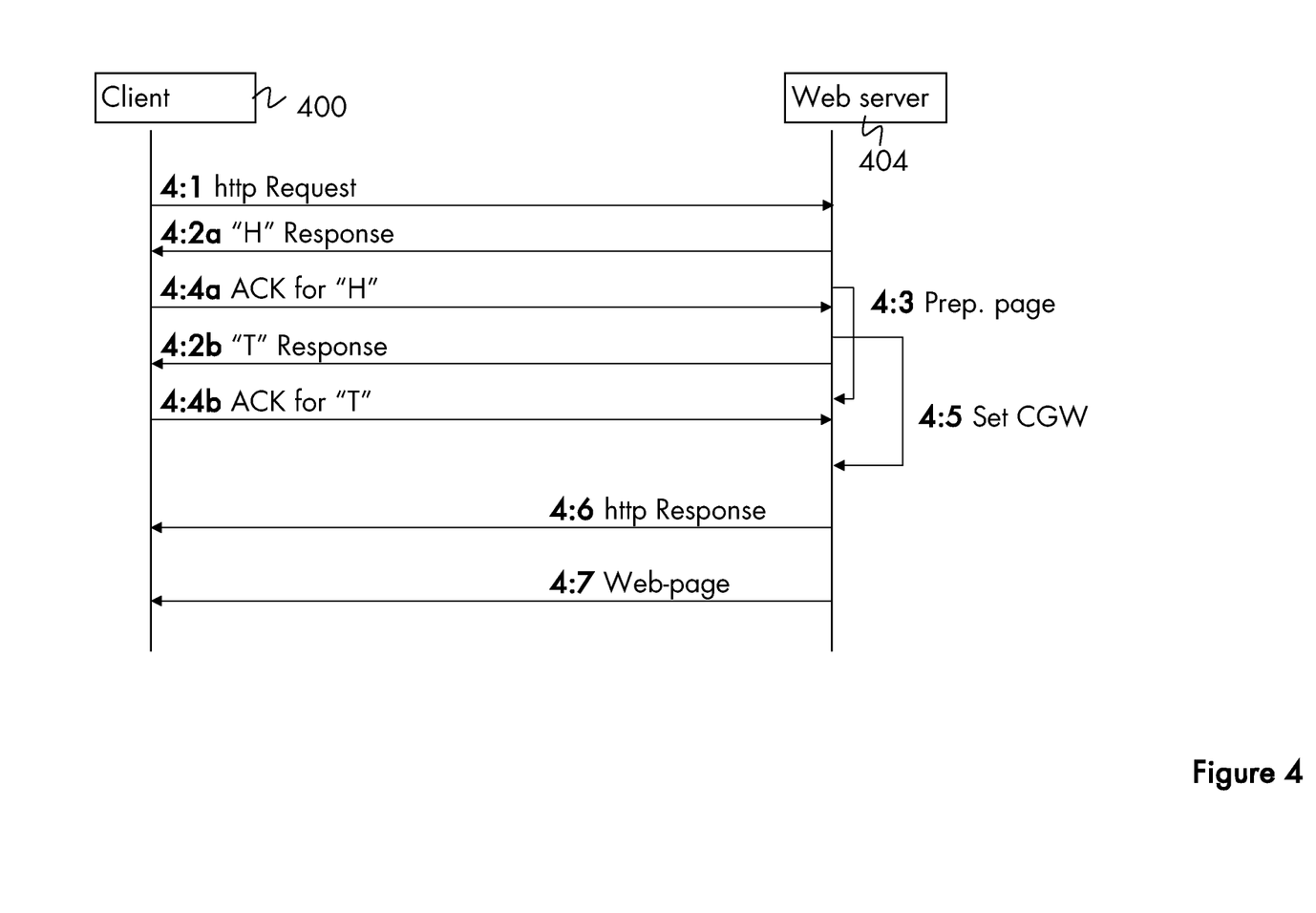
FIG. 4 is a signalling diagram which schematically illustrates a procedure for downloading of a webpage, according to another embodiment.

With reference to FIG. 4, which shows another signalling chart, a scenario where a client 400 downloads a webpage from a web server 404 without requiring any intermediate proxy will now be schematically described according to an exemplifying embodiment.

The client 400 communicates with the web server 404 on a TCP connection.

When the client 400 wants to download a webpage from the web server 404, the client sends 4:1 a request for the webpage to the web server 404, the request here being implemented as "http/1.1 get". The web server 404 then initiates an evaluation of the available communication capacity of the TCP connection by sending 4:2a a first response in one IP packet to the client 400, before preparing 4:3 the webpage to be downloaded. The first response comprises a first legal symbol of a subsequent response which will be sent later. In this exemplifying embodiment, the subsequent response is implemented as the http command "http/1.0 200 OK", and the first response therefore comprises the legal symbol "h". Upon a successful reception of the sent 4:2a response at the client 400, the web server 404 receives 4:4a an acknowledging ACK sent in response from the client 400.

When having received 4:4a the ACK, the web server 404 continues to interact with the client 400 by sending 4:2b one or more intermediate responses, and, by receiving 4:4b from the client 400 for each successfully received response a corresponding ACK. Corresponding to the embodiment described above, the first intermediate response 4:2b is implemented as two similarly sent IP packets, comprising the legal symbols "t", and "t", respectively, and the second intermediate response is implemented as four IP packets, comprising the legal symbols "p", "/", "1", ".", respectively, etc., i.e. subsequent legal symbols of the http command referred to above. For each acknowledged intermediate response, the web server increases 4:5 the congestion window, e.g. from 1 IP packet to 2, from 2 IP packets to 4, etc.

During the described interaction between the client 400 and the web server 404, the web server 404 prepares 4:3 the webpage to be downloaded, and when the webpage is prepared the web server indicates this by sending 4:6 a subsequent response to the client 400. The subsequent response is here implemented as the remaining part of the http command referred to above, i.e. the http command with already sent legal symbols being removed, as discussed above in the other exemplifying embodiment. The web server 404 then sends 4:7 the prepared webpage to the client 400 by applying the congestion window according to the interaction.

Even if the above described exemplifying embodiments describes downloading of a webpage, the skilled person realises that the concept described herein may be applied also when downloading other types of HTTP transferred data, or HTTPS transferred data, i.e. Hypertext Transfer Protocol Secure transferred data enabling encrypted data communication, from any type of server capable of downloading the respective type of data. Furthermore, he/she is capable to amend the method accordingly.

Figure 5A:
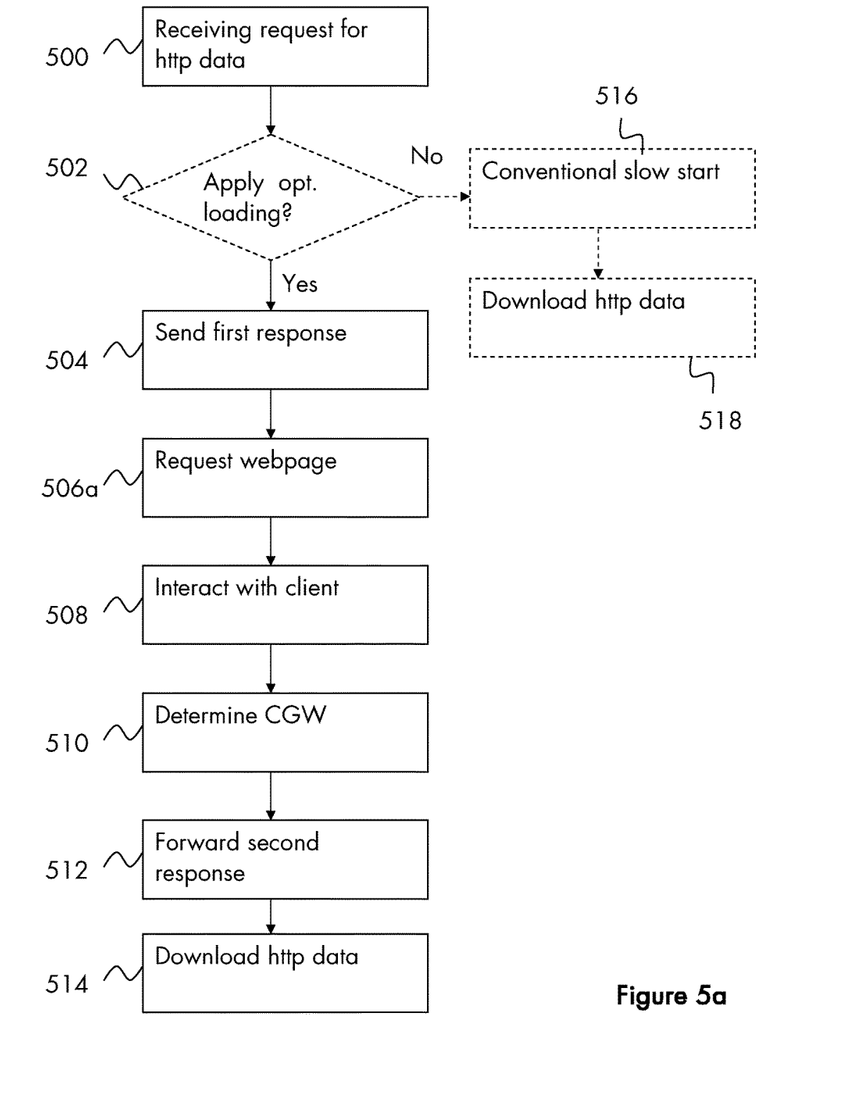
FIGS. 5a-b are flow charts which schematically illustrate, procedures for downloading of a webpage, according to different embodiments.

With reference to FIG. 5a, which shows a flow chart, a method executed in a proxy server, where a client downloads HTTP transferred data, from a web server via a proxy server, will now be schematically described according to an exemplifying embodiment.

The proxy server is associated to a client on a first TCP connection and the proxy server is further associated to a web server on a second TCP connection.

The proxy server communicates with the client on a first TCP connection, and communicates with the web server on a second TCP connection.

In a first action 500, the proxy server receives a request for HTTP transferred data, e.g. a webpage, from a client, where the request is formatted according to HTTP. The proxy server then sends, in a subsequent action 504, a first response to the client, comprising a first legal symbol ahead of a subsequent response which will be sent later. The first response corresponds to the first response according to 3.2a and the ACK according to 3:4a of FIG. 3.

In a following action 506a, the proxy server requests the HTTP transferred data from the web server by forwarding the first request to the web server. The action 506a corresponds to the forwarding 3:3 of the first request described with reference to FIG. 3.

Then in a subsequent action 508, the proxy server continues interacting with the client to find the available communication capacity on the first TCP connection, by sending intermediate responses comprising further legal symbols ahead of the subsequent response, and receiving corresponding acknowledgements. The action 508 corresponds to the sending of the first response 3:2a, the receiving of ACK:s 3:4a, 3:4b, and the sending of intermediate responses 3:4b, . . . shown in FIG. 3.

Based on the interaction of action 508, the proxy server determines the available communication capacity of the first TCP connection, in a following action 510, corresponding to the increasing 3:6 of the congestion window shown in FIG. 3.

When the HTTP transferred data is prepared at the web server, the proxy server receives the subsequent response from the web server, which is forwarded by the proxy server to the client in a following action 512. When forwarding the subsequent response, already sent legal symbols of the subsequent response are removed from the subsequent response, which corresponds to the forwarding 3:8 of the subsequent response shown in FIG. 3.

In a final action 514, the proxy server receives the HTTP transferred data, which is forwarded to the client, applying the determined available communication capacity. The receiving and forwarding of the HTTP transferred data corresponds to the receiving 3:9 and the forwarding 3:10 shown in FIG. 3.

In an alternative exemplifying embodiment, which is based on the embodiment above, an intermediate action 502 follows the action 500. In the intermediate action 502, the proxy server automatically decides whether the download of the HTTP transferred data will be performed by optimised downloading, as described above, or according to conventional TCP methods. The decision is here based on knowledge about the first TCP connection. Typically, such knowledge may include awareness of the type of communication link, and/or knowledge of the communication capacity of the TCP connection. However, an implementing designer is not limited thereto but may alternatively make use of knowledge about the type of communication terminal at the client, or heuristic analyses of the available communication capacity of the TCP connection, the amount of HTTP data to be transferred or any other data or combination of data. By applying such an option, optimised downloading may be applied only when required, under the present circumstances.

Even if the proxy server in this exemplifying embodiment automatically decides whether to apply optimised downloading or not, the method may instead be implemented differently within the concept, e.g. by enabling a client to manually decide whether or not to apply optimised downloading.

If the proxy server decides to apply optimised downloading, the proxy server proceeds with performing the actions 504, 506a, 508, 510, 512, and 514, which are described in the embodiment above. Else, if the proxy server in action 502 instead decides to not apply optimised download, it will in a following action 516 perform a conventional slow start according to TCP, and start downloading the HTTP transferred data with a communication capacity according to the performed slow start in a final action 518.

For the exemplifying embodiments described above, it is to be understood that even if the download of HTTP transferred data of action 510 starts with the determined available communication capacity, the proxy server may then adjust the congestion window based on variations in communication capacity. Such adjustments may be performed according to ordinary TCP methods and will not be further discussed herein.

Figure 5B:
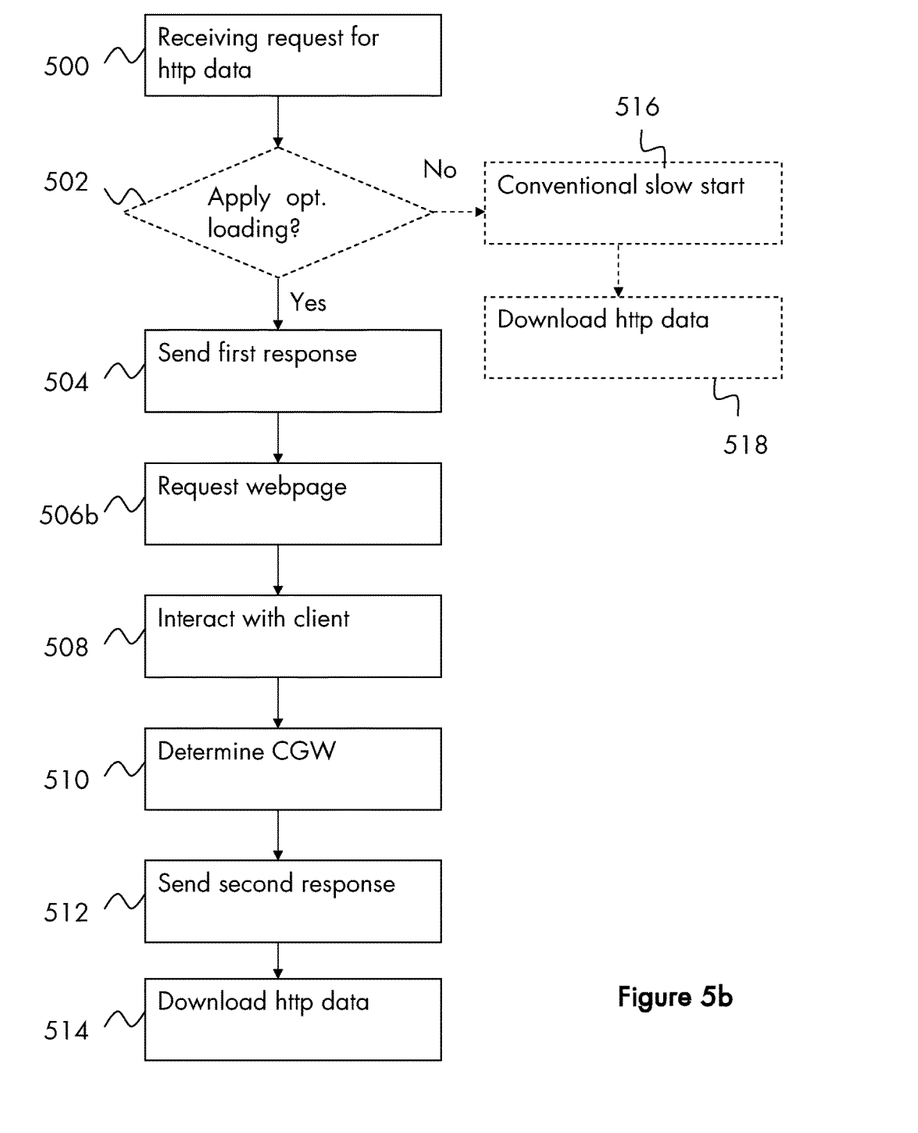

With reference to FIG. 5b, which shows a flow chart, a method executed in a web server, where a client downloads a webpage from the web server, will now be schematically described according to an exemplifying embodiment.

This exemplifying embodiment is similar to the exemplifying embodiment described with reference to FIG. 5a, and therefore the same reference numbers are used. However, the method is performed in a web server instead as in a proxy server, the action 506a is omitted, and instead an action 506b of preparing the webpage is performed. Moreover, the TCP connection associating the client with the web server is referred to as just "TCP connection" instead of as "first TCP connection".

In a first action 500, the web server receives from a client a request for HTTP transferred data, e.g. a webpage. The request is formatted according to HTTP. The web server sends then, in a subsequent action 504, a first response to the client, comprising a first legal symbol ahead of a subsequent response which will be sent later.

In a following action 506b, the web server prepares the HTTP transferred data. The action 506b corresponds to the preparing 4:3 described with reference to FIG. 4.

Then in a subsequent action 508, the web server continues interacting with the client to find the available communication capacity on the TCP connection, by sending intermediate responses comprising further legal symbols ahead of the subsequent response, and receiving corresponding acknowledgements.

Based on the interaction of action 508, the web server determines the available communication capacity of the TCP connection, in a following action 510.

When the HTTP transferred data is prepared at the web server, the web server sends the subsequent response to the client in a following action 512. When sending the subsequent response, already sent legal symbols of the subsequent response are removed from the subsequent response.

In a final action 514, the web server sends the HTTP transferred data to the client, applying the determined available communication capacity.

Figure 6:
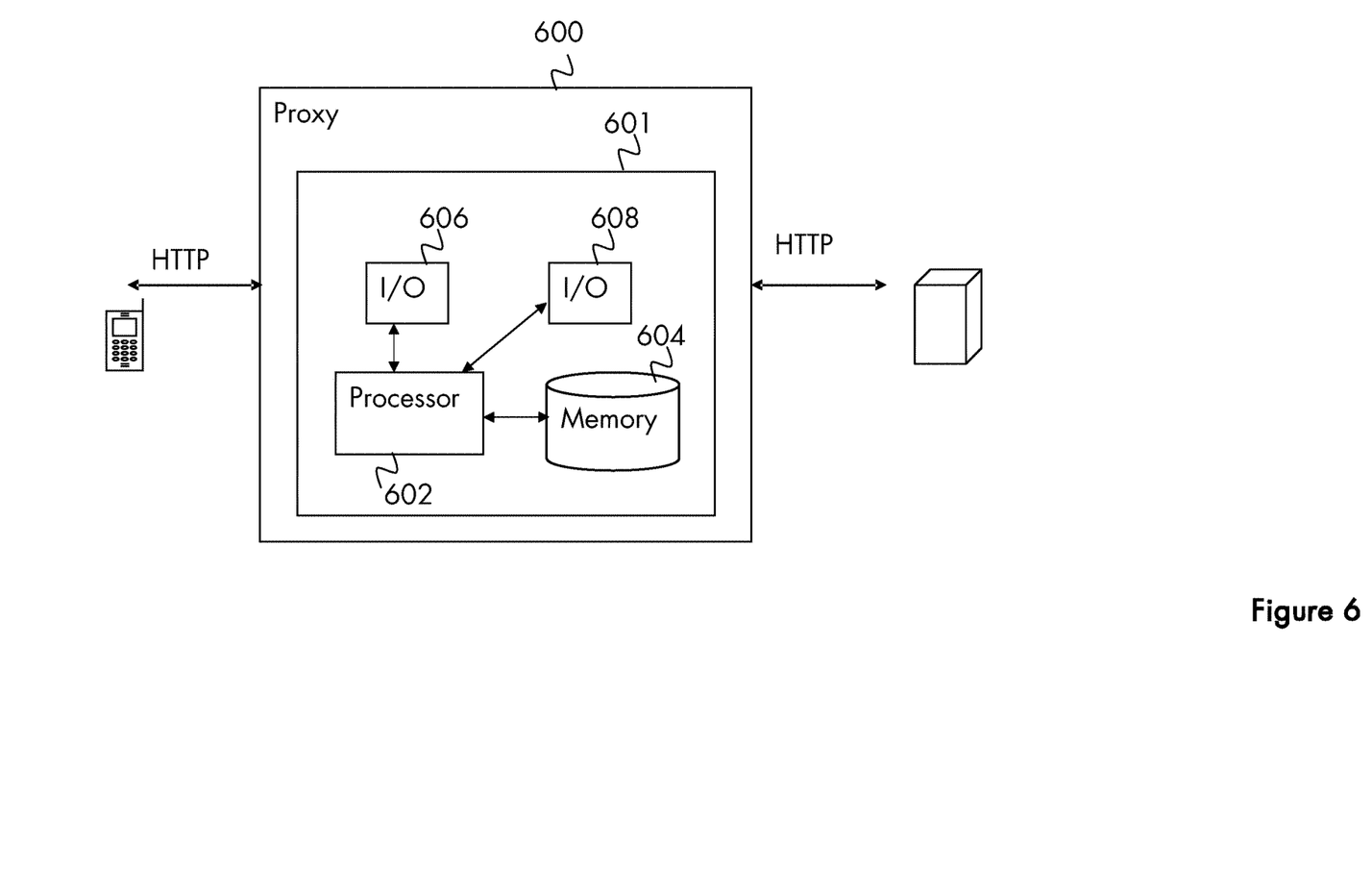
FIG. 6 is a block diagram which schematically illustrates an arrangement for downloading of a webpage, according to one embodiment.

With reference to FIG. 6, which shows a block diagram, a computer 601 comprised in a communication network node 600, such as e.g. a proxy server, or any other node comprising proxy server functionality will now be schematically described according to an exemplifying embodiment. In the figure, the client shown as a mobile phone to the left of the computer 601, and the web server is shown to the right of the computer 601.

The computer 601 is associated to the client on a first TCP connection and further associated to the web server on a second TCP connection. The computer 601 comprises a processor 602, a memory 604, a first communication unit 606, and a second communication unit 608. The first communication unit 606 is adapted to serve the processor 602 when communicating HTTP transferred data with the client, and the second communication unit 608 is adapted to serve the processor 602 when communicating HTTP transferred data with the web server, i.e. HTTP transferred data is communicated via the first communication unit 606 and the second communication unit 608, respectively. The memory 604 is adapted to store instructions which when executed by the processor 602 causes the processor 602 to: receive from the client a request for HTTP transferred data, request the HTTP transferred data from the web server, and initiate an evaluation of the communication capacity of the first TCP connection, the communication capacity to be applied when downloading the HTTP transferred data to the client after being received from the web server.

The computer 601 may be implemented as a proxy server, and executing the described instructions, corresponds to performing the method described with reference to FIG. 3. The instructions stored in the memory 604 are typically implemented as a computer program. The program may be constructed of various program modules, providing various functionality capable of executing the various steps of the method described above, e.g. an interaction module for generating the interaction with the client, a retrieve module for obtaining HTTP transferred data from the web server, a control module for determining the available communication capacity of the first TCP connection, and an optional activation module for determining whether or not to apply the optimised downloading.

Figure 7:
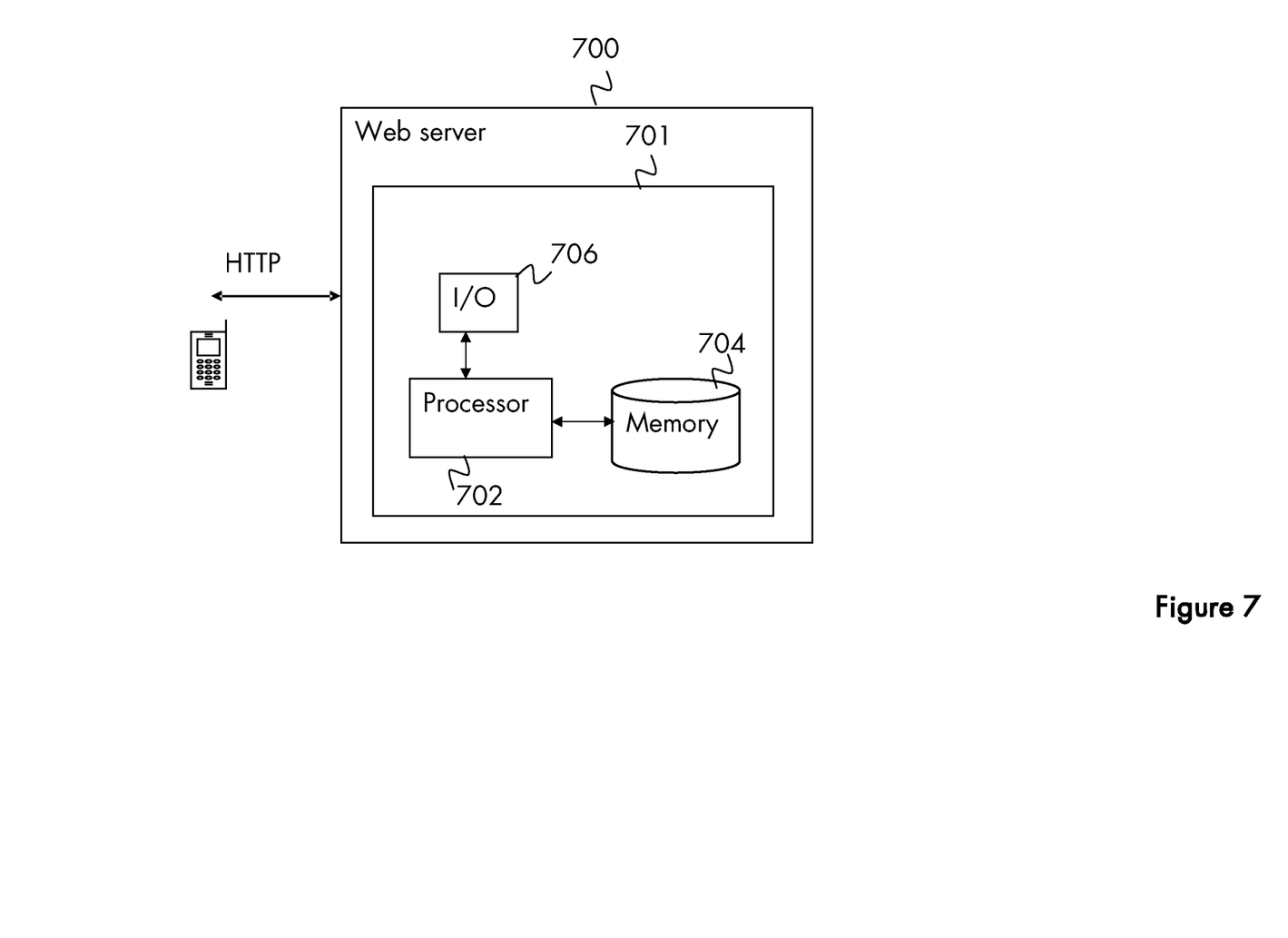
FIG. 7 is a block diagram which schematically illustrates an arrangement for downloading of a webpage, according to one embodiment.

With reference to FIG. 7, which shows a block diagram, a computer 701 comprised in a communication network node 701, such as e.g. a web server, or any other server capable of downloading HTTP transferred data to a requesting client will now be schematically described according to an exemplifying embodiment. In the figure, the client shown as a mobile phone to the left of the computer 701, and the web server is shown to the right of the computer 701.

The computer 701 is associated to the client on a TCP connection. The computer 701 comprises a processor 702, a memory 704, and a communication unit 706. The communication unit 706 is adapted to serve the processor 702 when communicating HTTP transferred data with the client, i.e. HTTP transferred data is communicated via the communication unit 706. The memory 704 is adapted to store instructions which when executed by the processor 702 causes the processor 702 to: receive from the client a request for HTTP transferred data, initiate an evaluation of the communication capacity of the TCP connection, the communication capacity to be applied when downloading the HTTP transferred data to the client.

The computer 701 may be implemented as a web server, and executing the described instructions, corresponds to performing the method described with reference to FIG. 4. The instructions stored in the memory 704 are typically implemented as a computer program. The program may be constructed of various program modules, providing functionality, e.g. an interaction module for generating the interaction with the client, a control module for determining the available communication capacity of the TCP connection, and an optional activation module for determining whether or not to apply the optimised downloading.

It should be noted that FIGS. 6 and 7 merely illustrates various functional units in the computers 601 and 701, respectively, in a logical sense, although the skilled person is free to implement these functions in practice using any suitable software and hardware means. Thus, the invention is generally not limited to the shown structure of the computers 601, 701, while their functional units may be configured to operate according to the methods and procedures described above for FIGS. 3 to 5, where appropriate. For instance, any functionality in a specific functional unit may be placed in another suitable functional unit, where appropriate.

In an alternative embodiment which is based on the one described above, the memory 604 is further adapted to store or access information regarding the type of communication link for the first TCP connection, information regarding software at the client, and information regarding performed communication on the first TCP connection, alone or in combination, or any other data indicative of the resources available for the requested download. The mentioned information enables the processor 602 to make a decision whether it is beneficial to perform optimised downloading, or not. Based on such a decision, the processor 602 may then select to apply optimised downloading, or apply slow start according to conventional TCP methods.

It is to be understood that the computers and servers described above in this description also comprises additional conventional means providing functionality, such as e.g. various control units and memories, necessary for enabling common functions and features to operate properly. However, for simplicity reasons, any means or functionality which is not necessary for the understanding of the proposed enabling of the terminating services has been omitted in the figures, and will not be discussed in any further detail in this description. Furthermore, it is to be understood that even if the clients, the proxy servers, and the web servers are associated directly to each other in the embodiment examples, intermediate units which are not necessary for the understanding of the concept have been omitted in the figures.

While the solution has been described with reference to specific exemplary embodiments, the description is generally only intended to illustrate the inventive concept and should not be taken as limiting the scope of the solution. When designing an arrangement or devising a method for optimised downloading of HTTP transferred data, the implementing designer is free to combine features from the described exemplifying embodiments. The solution is defined by the appended claims.

The invention claimed is:

1. A method in a first communication network node in a communication network for enabling optimised downloading of HyperText Transfer Protocol (HTTP) transferred data to a client, the first communication network node being associated to the client by a first Transmission Control Protocol (TCP) connection, and the first communication network node being further associated to a second communication network node by a second TCP connection, the method comprising:
   receiving, by the first communication network node, a request from the client, requesting for the HTTP transferred data from the second communication network node,
   initiating an interaction between the first communication network node and the client by sending to the client a first response in response to the request and sending one or more intermediate responses,
   determining an available bit-rate for the requested HTTP transferred data at least partly based on the interaction between the first communication network node and the client,
   forwarding, by the first communication network node, the request to the second communication network node, and forwarding, by the first communication network node, a subsequent response to the client, received from the second communication network node in response to the forwarded request, and
   forwarding to the client, by the first communication network node, the HTTP transferred data at the available bit-rate, after being received from the second communication network node,
   wherein the first response, comprising a part of the subsequent response, is sent to the client before remaining parts of the subsequent response are forwarded to the client, and
   wherein the interaction between the client and the first communication network node to determine the available bit-rate is performed until the HTTP transferred data is made available by the second communication network node.

2. The method according to claim 1, wherein the interaction further comprises: receiving one or more acknowledgements, and sending the one or more intermediate responses, each acknowledgment of the one or more acknowledgements acknowledging a successful reception of a respective of the first response or the one or more intermediate responses.

3. The method according to claim 2, wherein the request, each response, and each associated acknowledgement, is formatted in accordance with any of HyperText Transfer Protocol (HTTP), or HyperText Transfer Protocol Secure (HTTPS).

4. The method according to claim 2, wherein the first communication network node is a Proxy Server, and the second communication network node is a Web Server.

5. The method according to claim 1, the method further comprising an action of deciding on whether or not the first response shall be sent to the client before the subsequent response is forwarded to the client, the action of deciding being based on one or more of: knowledge about communication properties of the first TCP connection, and knowledge about software properties at the client.

6. The method according to claim 5, wherein the knowledge about communication properties of the first TCP connection comprises one or more of: type of TCP connection, heuristics based on prior determined available bit-rates for the first TCP connection, and location awareness of the client.

7. The method according to claim 1, wherein the determined available bit-rate is stored at the first communication network node.

8. The method according to claim 1, wherein the HTTP transferred data is communicated between the first communication network node and the client by applying a wireless communication network for the first TCP connection, the wireless communication network being implemented as one of: Long Term Evolution (LTE); High Speed Packet Access (HSPA); and Groupe Special Mobile/General Packet Radio Service (GSM/GPRS).

9. The method according to claim 1, wherein HTTP transferred data is communicated between the first communication network node and the client by applying a fixed communication network for the first TCP connection.

10. A computer program product comprising a non-transitory computer readable medium storing computer readable program code which when run by a processor of a first communication network node causes the first communication network node to perform the method in the first communication network node for enabling optimised downloading of HyperText Transfer Protocol (HTTP) transferred data to a client, the first communication network node being associated to the client by a first Transmission Control Protocol (TCP) connection, and the first communication network node being further associated to a second communication network node by a second TCP connection, the method comprising:
receiving, by the first communication network node, a request from the client, requesting for the HTTP transferred data from the second communication node,
initiating an interaction between the first communication network node and the client by sending to the client a first response in response to the request and sending one or more intermediate responses,
determining an available bit-rate for the requested HTTP transferred data at least partly based on the interaction between the first communication network node and the client;
forwarding, by the first communication network node, the request to the second communication network node, and forwarding, by the first communication network node, a subsequent response to the client, received from the second communication network node in response to the forwarded request, and
forwarding to the client, by the first communication network node, the HTTP transferred data at the available bit-rate, after being received from the second communication network node,
wherein the first response, comprising a part of the subsequent response, is sent to the client before remaining parts of the subsequent response are forwarded to the client, and
wherein the interaction between the client and the first communication network node to determine the available bit-rate is performed until the HTTP transferred data is made available by the second communication network node.

11. A method in a communication network node in a communication network for enabling optimised downloading of HyperText Transfer Protocol (HTTP) transferred data, to a client, the communication network node being associated to the client by a Transport Control Protocol (TCP) connection, the method comprising:
receiving from the client a request for the HTTP transferred data;
initiating an interaction between the communication network node and the client by sending to the client a first response to the request and sending one or more intermediate responses,
determining an available bit-rate for the requested HTTP transferred data at least partly based on the interaction between the communication network node and the client,
sending to the client a subsequent response, in response to the request, and
sending the HTTP transferred data to the client at the available bit-rate,
wherein the first response, comprising a part of the subsequent response, is sent to the client before remaining parts of the subsequent response are sent to the client, and
wherein the interaction between the client and the communication network node to determine the available bit-rate is performed until the HTTP transferred data is made available by the communication network node.

12. The method according to claim 11, wherein the communication network node, when performing the interaction further performs receiving one or more acknowledgements, and sending the one or more intermediate responses, each acknowledgment of the one or more acknowledgements acknowledging a successful reception of a respective of the first response and the one or more intermediate responses.

13. A computer for enabling optimised downloading of HyperText Transmission Protocol (HTTP) transferred data to a client, the computer being associated to the client by a first Transmission Control Protocol (TCP) connection, and the computer being further associated to a communication network node by a second TCP connection, wherein the computer comprises a processor, a memory, a first communication unit, and a second communication unit, and wherein the memory is adapted to store instructions which when executed by the processor causes the processor to:
receive, by the communication network node, a request from the client via the first communication unit, requesting for the HTTP transferred data from the communication network node,
initiate an interaction between the computer and the client by sending to the client via the first communication unit a first response in response to the request and sending one or more intermediate responses,
determine an available bit-rate for the requested HTTP transferred data at least partly based on the interaction between the computer and the client following the first response,
forward, by the communication network node, the request to the communication network node via the second communication unit, and forward, by the communication network node, a subsequent response to the client via the first communication unit, received from the communication network node via the first communication unit in response to the request, and
forward to the client via the first communication unit, by the communication network node, the HTTP transferred data received via the first communication unit from the communication network node at the available bit-rate, wherein the first response, comprising a part of the subsequent response, is sent to the client before remaining parts of the subsequent response are forwarded to the client, and wherein the interaction between the client and the computer to determine the available bit-rate is performed until the HTTP transferred data is made available by the communication network node.

14. The computer according to claim 13, wherein the memory is further adapted to store knowledge about characteristics of the client, knowledge about characteristics of the first Transmission Control Protocol (TCP) connection, and further instructions, which when executed by the processor causes the processor to:

decide that the first response shall be sent, based on one or more of: knowledge about communication properties of the first TCP connection, and knowledge about software properties at the client.

15. The computer according to claim 14, wherein the memory is further adapted to store heuristics based on prior determined available bit-rates for the first TCP connection, and further instructions, which when executed by the processor causes the processor to store the determined available bit-rate.

16. A proxy server comprising a computer for enabling optimised downloading of HyperText Transmission Protocol (HTTP) transferred data to a client, the computer being associated to the client by a first Transmission Control Protocol (TCP) connection, and the computer being further associated to a communication network node by a second TCP connection, wherein the computer comprises a processor, a memory, a first communication unit, and a second communication unit, and wherein the memory is adapted to store instructions which when executed by the processor causes the processor to:

receive, by the communication network node, a request from the client via the first communication unit, requesting for the HTTP transferred data from the communication network node, initiate an interaction between the computer and the client by sending to the client via the first communication unit a first response in response to the request and sending one or more intermediate responses, determine an available bit-rate for the requested HTTP transferred data at least partly based on the interaction between the computer and the client following the first response, forward, by the communication network node, the request to the communication network node via the second communication unit, and forward, by the communication network node, a subsequent response to the client via the first communication unit, received from the communication network node via the first communication unit in response to the request, and forward to the client via the first communication unit, by the communication network node, the HTTP transferred data received via the first communication unit from the communication network node at the available bit-rate, wherein the first response, comprising a part of the subsequent response, is sent to the client before remaining parts of the subsequent response are forwarded to the client, and wherein the interaction between the client and the computer to determine the available bit-rate is performed until the HTTP transferred data is made available by the communication network node.

17. A computer for enabling optimised downloading of HyperText Transmission Protocol (HTTP) transferred data to a client, the computer being associated to the client by a Transmission Control Protocol (TCP) connection, wherein the computer comprises a processor, a memory, and a communication unit, and wherein the memory is adapted to store instructions which when executed by the processor causes the processor to:

receive from the client via the communication unit a request for the HTTP transferred data, initiate an interaction between the computer and the client by sending to the client via the communication unit a first response in response to the request and sending one or more intermediate responses, determine an available bit-rate for the requested HTTP transferred data at least partly based on the interaction between the computer and the client following the first response, send to the client via the communication unit, a subsequent response in response to the request, and send the HTTP transferred data to the client via the communication unit at the available bit-rate, wherein the first response, comprising a part of the subsequent response, is sent before remaining parts of the subsequent response are sent, and wherein the interaction between the client and the computer to determine the available bit-rate is determined until the HTTP transferred data is made available by the computer.

18. A web server comprising a computer for enabling optimised downloading of HyperText Transmission Protocol (HTTP) transferred data to a client, the computer being associated to the client by a Transmission Control Protocol (TCP) connection, wherein the computer comprises a processor, a memory, and a communication unit, and wherein the memory is adapted to store instructions which when executed by the processor causes the processor to:

receive from the client via the communication unit a request for the HTTP transferred data, initiate an interaction between the computer and the client by sending to the client via the communication unit a first response in response to the request and sending one or more intermediate responses, determine an available bit-rate for the requested HTTP transferred data at least partly based on the interaction between the computer and the client following the first response, send to the client via the communication unit, a subsequent response in response to the request, and send the HTTP transferred data to the client via the communication unit at the available bit-rate, wherein the first response, comprising a part of the subsequent response, is sent before remaining parts of the subsequent response are sent, and wherein the interaction between the client and the computer to determine the available bit-rate is determined until the HTTP transferred data is made available by the computer.

* * * * *